United States Patent
Danielsson et al.

(10) Patent No.: US 11,627,318 B2
(45) Date of Patent: Apr. 11, 2023

(54) METHOD AND SYSTEM FOR PRODUCING STREAMS OF IMAGE FRAMES

(71) Applicant: Axis AB, Lund (SE)

(72) Inventors: Niclas Danielsson, Lund (SE); Xing Danielsson Fan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/523,280

(22) Filed: Nov. 10, 2021

(65) Prior Publication Data

US 2022/0182625 A1 Jun. 9, 2022

(30) Foreign Application Priority Data

Dec. 7, 2020 (EP) .................................... 20212217

(51) Int. Cl.
*G06T 7/194* (2017.01)
*H04N 19/119* (2014.01)
(Continued)

(52) U.S. Cl.
CPC .......... *H04N 19/119* (2014.11); *G06F 18/24* (2023.01); *G06F 18/40* (2023.01); *G06T 7/194* (2017.01);
(Continued)

(58) Field of Classification Search
CPC .... H04N 19/119; H04N 7/013; H04N 19/137; H04N 19/162; H04N 19/176;
(Continued)

(56) References Cited

U.S. PATENT DOCUMENTS

| 9,584,814 B2 | 2/2017 | Socek et al. |
| 2013/0170557 A1* | 7/2013 | Wang ............... G06T 7/254 375/240.24 |

(Continued)

FOREIGN PATENT DOCUMENTS

| CN | 105335951 A | 2/2016 |
| WO | 2010/057170 A1 | 5/2010 |

(Continued)

OTHER PUBLICATIONS

Extended European Search Report dated Mar. 25, 2021 for European Patent Application No. 20212217.2.
(Continued)

*Primary Examiner* — Hesham K Abouzahra
(74) *Attorney, Agent, or Firm* — Volpe Koenig

(57) ABSTRACT

Methods, systems and computer program products, for producing streams of image frames. Image frames in streaming video are segmented into background segments and instance segments. A background image frame containing the background segments is created. At least some of the instance segments are classified into movable objects of interest and movable objects of non-interest. During a background update time period, the background image frame is updated when a movable object of non-interest has moved to reveal a background area, to include the revealed background area in the background image frame. A foreground image containing the movable objects of interest is created. Blocks of pixels of the updated background and foreground image frames are encoded. A stream of encoded foreground image frames having a first frame rate is produced. A stream of encoded updated background image frames a second, lower frame rate is produced.

13 Claims, 3 Drawing Sheets

(51) Int. Cl.
  *H04N 19/137* (2014.01)
  *H04N 19/162* (2014.01)
  *H04N 19/176* (2014.01)
  *G06T 7/215* (2017.01)
  *G06V 20/52* (2022.01)
  *H04N 7/01* (2006.01)
  *G06F 18/24* (2023.01)
  *G06F 18/40* (2023.01)
  *H04N 7/18* (2006.01)

(52) U.S. Cl.
  CPC .............. *G06T 7/215* (2017.01); *G06V 20/52* (2022.01); *H04N 7/013* (2013.01); *H04N 19/137* (2014.11); *H04N 19/162* (2014.11); *H04N 19/176* (2014.11); *G06T 2207/10016* (2013.01); *G06T 2207/30232* (2013.01); *H04N 7/183* (2013.01)

(58) Field of Classification Search
  CPC .... H04N 7/183; H04N 19/132; H04N 19/167; H04N 19/20; H04N 19/507; H04N 19/17; H04N 19/139; H04N 19/146; G06K 9/6253; G06K 9/6267; G06T 7/194; G06T 7/215; G06T 2207/10016; G06T 2207/30232; G06T 7/11; G06V 20/52
  See application file for complete search history.

(56) References Cited

U.S. PATENT DOCUMENTS

| | | | |
|---|---|---|---|
| 2016/0205341 A1 | 7/2016 | Hollander et al. | |
| 2019/0191196 A1* | 6/2019 | Dabrowski | H04N 21/8456 |
| 2020/0143576 A1 | 5/2020 | Ray | |
| 2021/0158043 A1* | 5/2021 | Hou | G06V 10/762 |
| 2021/0168408 A1* | 6/2021 | Malakhov | H04N 19/167 |

FOREIGN PATENT DOCUMENTS

| | | |
|---|---|---|
| WO | 2020/036502 A1 | 2/2020 |
| WO | 2020/036502 A8 | 1/2021 |

OTHER PUBLICATIONS

Ebrahimi et al. "MPEG-4 natural video coding—An overview." Signal Process. Image Commun. 15 (2000): 365-385.
Ouaknine, "Review of Deep Learning Algorithms for Object Detection," https://medium.com/zylapp/review-of-deep-learning-algorithms-for-object-detection-c1f3d437b852 , Available at: https://web.archive.org/web/20210527100514/https://medium.com/zylapp/review-of-deep-learning-algorithms-for-object-detection-c1f3d437b852 (May 6, 2021).

* cited by examiner

METHOD AND SYSTEM FOR PRODUCING STREAMS OF IMAGE FRAMES

FIELD OF INVENTION

The present invention relates to video encoding, and more specifically to producing streams of video in a bandwidth efficient manner.

TECHNICAL BACKGROUND

Cameras, such as monitoring cameras are used in many different applications, both indoors and outdoors, for monitoring a variety of environments. Images depicting a captured scene may be monitored by, e.g., an operator or a security guard. In many situations, certain objects in a captured image may be of more interest than others to an operator. For example, an operator of the monitoring camera may be very interested in human activity, but may be less interested in other moving or changing, yet unimportant, objects in an image, such as animals, passing vehicles or trees that move in the wind.

However, conventional encoders typically encode the entire image frames of the video stream in the same way, regardless of the operator's interests. As a result, the "less interesting" portions of an image frame often contribute significantly to the bandwidth, especially when there are small changes in the background due to moving objects. This may also lead to higher storage usage than what would be necessary had only the most "interesting" information in an image or video stream been kept. Therefore, it would be interesting to find solutions to video encoding that further reduces the bandwidth used by a monitoring camera, as well as the storage requirements for long-term storage.

SUMMARY

According to a first aspect, a method, in an encoding system, for producing streams of image frames comprises:
  segmenting image frames in a stream of image frames into one or more background segments and one or more instance segments;
  creating a background image frame that contains the one or more background segments;
  classifying at least some of the one or more instance segments into movable objects of interest and into movable objects of non-interest;
  updating, during a background update time period, the background image frame when a movable object of non-interest has moved to reveal a (further) background area, to include the revealed/further background area in the background image frame;
  creating a foreground image frame that contains the movable objects of interest;
  encoding blocks of pixels of the updated background image frame;
  encoding blocks of pixels of the foreground image frame;
  producing a stream of encoded foreground image frames having a first frame rate; and
  producing a stream of encoded updated background image frames having a second frame rate that is lower than the first frame rate.

This method reduces the streaming bandwidth needed for streaming video, compared to when conventional encoding is used, since only the information of interest to the operator is streamed at a high image frame rate, e.g., 30 image frames per second, whereas information that is of little or no interest to the operator is streamed at a much lower rate, such as one image frame per minute. Since the background is streamed at a low bitrate, it is also possible to catch slow overall changes of the scene, such as light changes due to the slow transition from night to day, or a sunny day that becomes cloudy, or when street lights are turned on in the evening, for example. This helps the operator to understand the overall scene better compared to having a completely fixed background, and ensures that the light settings are updated to be roughly the same between the two streams. Further, by reducing the amount of information (i.e., image data) that the operator needs to mentally process, she can focus her attention on the most important aspects of the surveillance situation and more accurately detect any potential dangers or threats. Yet further, reducing the bitrate also makes it possible to provide optimal visual quality for the particular use case at hand, since the saved bandwidth can be used to enhance the instance segments. The background segments may be background areas and the instance segments may be objects detected by means of object detection. The movable objects of interest may be movable objects of interest to a user, and the movable objects of non-interest may be movable objects of non-interest to a user.

According to one embodiment, the segmenting of image frames is done using panoptic segmentation, wherein pixels in the image frame are either assigned to a background segment representing a region including a group of objects of a particular type, or assigned to an instance segment representing an individual object. Panoptic segmentation is a well-known technique to those having ordinary skill in the art, and can be described as a combination of instance segmentation (i.e., identification and segmentation of individual instances in an image) and semantic segmentation (i.e., segmenting pixels in the image based on the class they belong to (rather than specific instances). Panoptic segmentation therefore lends itself particularly well to this type of applications, where part of the image (e.g., the background) should be treated differently from individual objects (e.g., objects of interest and/or objects of non-interest) with respect to encoding and transmission. This facilitates integration of the present embodiments with existing systems that may already use panoptic segmentation for various purposes.

According to one embodiment, the method further comprises receiving a user selection from a list of object types, the user selection indicating which types of objects should be considered movable objects of interest and movable objects of non-interest. Having the ability to select which objects are movable objects of interest and movable objects of non-interest provides great versatility for the operator, as this determination may change based on the time of the day or the time of the week. For example, an individual stopping to look through a storefront during normal business hours may not be very interesting to track for an operator, whereas an individual who exhibits the same behavior at 3 a.m. in the morning, may warrant some closer attention from the operator. So in such a case, a human can be selected as movable object of interest (even though the operator's interest may vary depending on the time of day). However, a dog sitting outside the same storefront will likely be considered a movable object of non-interest, irrespective the time of the day. Further, by providing a list of possible object types, the user can be presented with a limited and easy to digest selection of objects. For example, even if it were possible to identify a boat, there is typically no situation in which you would find a boat outside a storefront, and thus the boat does not need to be included on the list from which the operator can select movable objects of interest, even though the system may have the capability to do so.

According to one embodiment, the movable objects of interest include one or more of: humans, vehicles, weapons, bags, and face masks. Every surveillance situation is unique, but this list represents some of the more common movable objects of interest in common surveillance situations. While some of these objects may not be movable by themselves, they may be so when acted upon by a human. For example, a bike by itself may not be a movable object of interest, but a bike that is ridden by a person into an area that is under surveillance would very likely be considered a movable object of interest, and so on.

According to one embodiment, the movement of the movable object of non-interest is tracked by a motion and object detector during the background update time period, and the background image frame is updated several times before the expiration of the background update time period. Motion and object detection can be accomplished using a range of Deep Learning algorithms that are familiar to those having ordinary skill in the art. A non-exhaustive list of these techniques include: Region-based Convolutional Network (R-CNN), Fast Region-based Convolutional Network (Fast R-CNN) Faster Region-based Convolutional Network (Faster R-CNN), Region-based Fully Convolutional Network (R-FCN), You Only Look Once (YOLO), Single-Shot Detector (SSD), Neural Architecture Search Net (NASNet), and Mask Region-based Convolutional Network (Mask R-CNN). A description of each of these, can be found at https://medium.com/zylapp/review-of-deep-learning-algorithms-for-object-detection-c1f3d437b852 along with references to further detailed sources.

For example, assume the moving object of non-interest is a dog that is sitting in front of a wall. When the dog moves, a portion of the wall that was previously hidden by the dog is revealed, and needs to be filled in so as to show the wall rather than a "gaping hole" where the dog used to be when the background frame is sent to the operator. If the background update period is one minute, say, the dog may move several times and end up at a completely different part of the image frame compared to where the dog was at the expiration of the last background time update period. This may look awkward to the operator, and for that reason (among others) it is advantageous to update the background frame several times during the background update time period. Further, if the dog moves enough to leave the scene and reveal the entire background during the update time, the dog does not need to be rendered at all, but one can update the entire background. This can be done in a single update (or several updates). However, if the dog moves bit-by-bit or changes direction (e.g., moves partially to the right and then partially to the left), then the update cannot be done as a single update, and several incremental updates are needed during the background update time period.

According to one embodiment, encoding the foreground image frame includes encoding pixel data only for pixels corresponding to movable objects of interest, and encoding the remainder of the foreground image frame as black pixels. Only encoding pixel data for the movable object(s) of interest in the conventional way and encoding the remainder of the image frame as black pixels results in a substantially reduced bitrate, and thereby reduced/less bandwidth requirements when the encoded foreground image frames are transmitted. It should be noted that while black pixels (typically encoded as a zero) are mentioned here, the same or very similar savings could be achieved for any consistent pixel value. Since repeating the same pixel value (black or otherwise) does not really add any new information, it can be compressed very efficiently into a compact representation.

Conceptually, the savings in bitrate achieved through using this technique can be more readily understood by considering of how a black square would be encoded. Encoding every pixel in the black square by sending a byte for every pixel, even though the byte always has the same value (i.e., zero) would require a significant amount of memory. However, an equivalent way of representing the black square is to send the coordinates of its upper left corner, and the width and height of the black square, that is, only 4 values. For a large black square, the data needed to send this representation this is virtually nothing compared to sending a zero value for every single pixel in the black square. Thus, the bandwidth needed when using this technique is essentially the same as the bandwidth needed to send only the objects of interest. Of course, different real-life encoders use different encoding schemes, and there are many encoder-specific ways of saving bandwidth that may achieve similar results to this technique. However, the general principle remains the same, that is, blacking out the areas of non-interest, or encoding them using some other bandwidth-saving method, results in bandwidth usage that is essentially the same as it would have been, had those parts of the image not been sent at all.

According to one embodiment, the first frame rate is approximately thirty image frames per second and the second frame rate is approximately one image frame per minute. Having a background image frame update rate that is substantially lower than the typical image frame update rate, significantly reduces the amount of data that is transmitted, and the required bandwidth.

According to one embodiment, the method further comprises classifying an instance segment as a stationary object of non-interest and updating the background image to include the stationary object of non-interest. For example, a tree, a flag, a flashing neon sign, etc., can be identified as an instance segment, and while part of the object may move, there is typically no need to update such an object with the fast frame rate. Instead, the object can be classified as a stationary object of non-interest and be included in the background image frame, and thus be updated at the slower frame rate, again contributing to substantial saving in data that is transmitted.

According to one embodiment, the method further comprises: at the end of the background update time period, verifying a completeness of the updates to the background image frame; in response to determining that the background image frame updates are incomplete, determining which movable object of non-interest caused the incompleteness; and including the movable object of non-interest that caused the incompleteness in the foreground image frame. Again, referring to the above example with the dog, if the dog by the end of the background update time period has not moved sufficiently to reveal all of the background behind the dog, one would fall back to traditional encoding for that region by including the dog in the faster, foreground image stream. Otherwise there would be pixel regions that contain no update information. This allows the background updates to complete on time.

According to one embodiment, verifying a completeness includes determining if the entire background image frame has been updated. This is a standard, straightforward method of determining completeness, as it uses information that is already available in most systems. In one implementation, this can be done by checking for every pixel coordinate, whether a background pixel has been seen at that coordinate at any time (i.e., in any image) during the background update interval. Of course, the exact mechanisms for how this is implemented in the encoder will depend on the particular encoder at hand, but the conceptual description above will remain the same for varying types of decoders.

According to one embodiment, updating the background image frame when a movable object of non-interest has moved to reveal a background area includes: comparing the movement of the movable object of non-interest with one or more of an area-dependent threshold value, a distance-dependent threshold value and a time-dependent threshold value; and when the movement of the movable object of non-interest exceeds at least one threshold value, updating the background image frame. For example, a minimum area of movement, a minimum distance of movement and/or a minimum period of time can be set for a movable object of non-interest before a background update is triggered during the background update time period. Again, using the example with the dog, if the dog moves only a couple of inches or wags its tail, that may not be a sufficient amount of movement to trigger a background image frame update. However, if the dog moves two feet to the left or moves from laying down to sitting up, etc., that may be sufficient movement to warrant a background update. The exact threshold values can be configured by the operator based on a multitude of factors, such as the type of object and the particular circumstances at the scene.

According to one embodiment, the threshold values are set based on available computing resources, e.g., such that a frequency of the updating of the background image frame is limited to a frequency of updating that can be accommodated by available computing resources. For example, if the camera system has limited computing resources, it may be advantageous to try to defer any background image frame updates as long as possible, whereas if the camera system has plenty of computing resources, more frequent updates can be made.

According to a second aspect, the embodiments relate to an encoding system for producing streams of image frames. The system includes a motion and object detector and an encoder. The motion and object detector is configured to:
  segment image frames in a stream of image frames into one or more background segments and one or more instance segments; and
  classify at least some of the one or more instance segments into movable objects of interest and into movable objects of non-interest.
The encoder is configured to:
  create a background image frame that contains the one or more background segments;
  update, during a background update time period, the background image frame when a movable object of non-interest has moved to reveal a (further) background area, to include the revealed/further background area in the background image frame; and
  create a foreground image frame that contains the movable objects of interest.
  encode blocks of pixels of the updated background image frame;
  encode blocks of pixels of the foreground image frame;
  produce a stream of encoded foreground image frames having a first frame rate; and
  produce a stream of encoded updated background image frames having a second frame rate that is lower than the first frame rate.

The system advantages correspond to those of the method and may be varied similarly.

According to a third aspect, the embodiments relate to a computer program product for producing streams of image frames. The computer program contains instructions corresponding to the steps of:
  segmenting image frames in a stream of image frames into one or more background segments and one or more instance segments;
  creating a background image frame that contains the one or more background segments;
  classifying at least some of the one or more instance segments into movable objects of interest and into movable objects of non-interest;
  updating, during a background update time period, the background image frame when a movable object of non-interest has moved to reveal a (further) background area, to include the revealed/further background area in the background image frame;
  creating a foreground image frame that contains the movable objects of interest;
  encoding blocks of pixels of the updated background image frame;
  encoding blocks of pixels of the foreground image frame;
  producing a stream of encoded foreground image frames having a first frame rate; and
  producing a stream of encoded updated background image frames having a second frame rate that is lower than the first frame rate.

The computer program involves advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
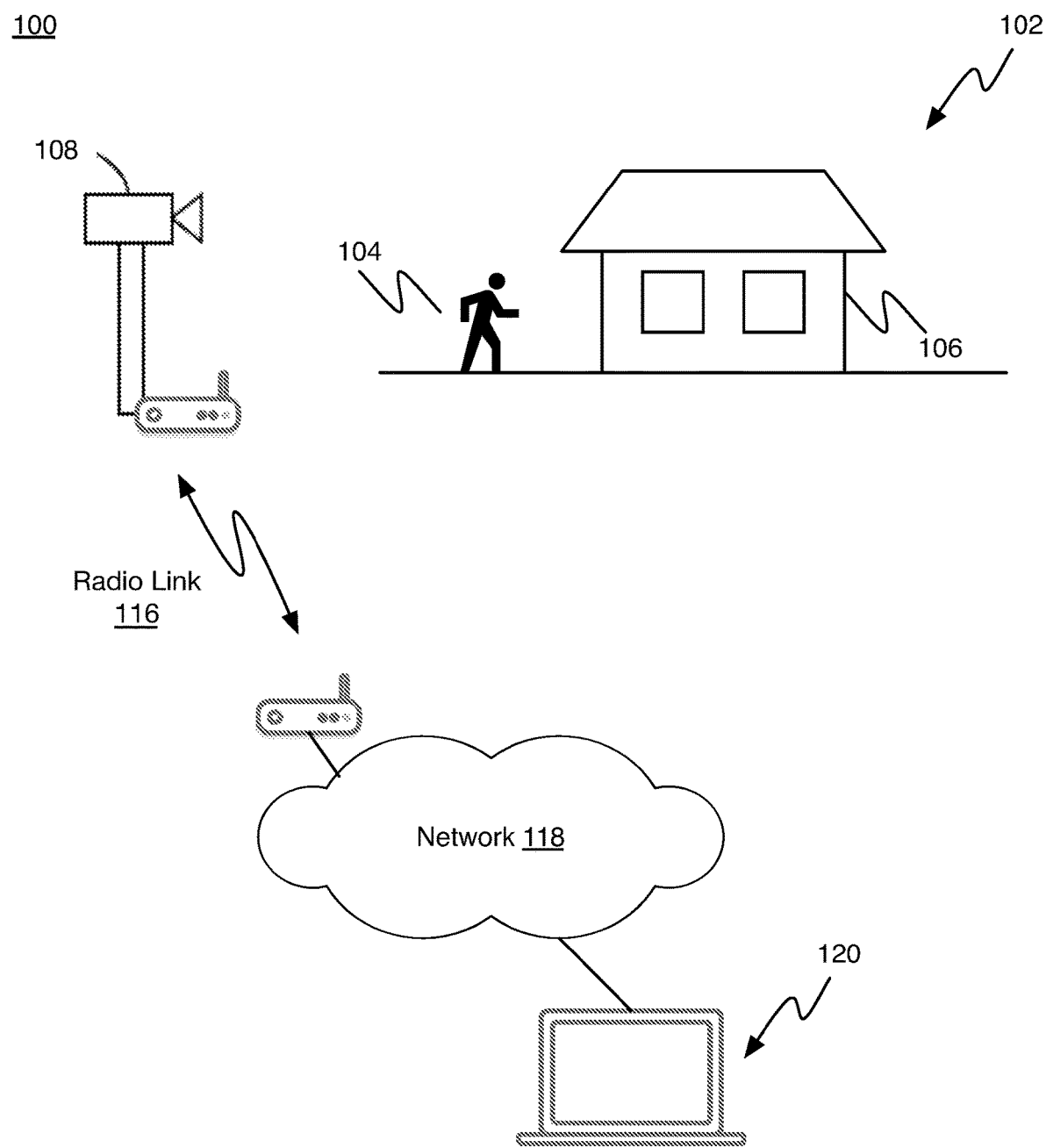
FIG. 1 is a schematic diagram showing an exemplary environment 100, in accordance with one embodiment, in which various methods and systems of the present disclosure can be applied.

As was described above, reducing the bandwidth needed for streaming video, compared to when conventional encoding is used would be beneficial. This is accomplished by streaming only the information that is of interest to the operator, and streaming that information at a high rate. Information that is of little or no interest to the operator is streamed at a significantly lower rate.

In brief, the various embodiments may be described as relating to a camera system comprising a camera, e.g., a fixed camera, that takes images of a scene, where an operator is interested in human activity, for example. A fixed camera is a camera that does not change its field of view during operation after installation. However, the camera may be a Pan Tilt Zoom (PTZ) camera capable of changing its field of view in pan and tilt directions, and to zoom-in and zoom-out its field of view. In case the camera is a PTZ camera, it should be understood that the PTZ camera is to be in a stationary stage or stationary mode, i.e., the PTZ camera should to be set to have one and the same pan, tilt and zoom setting, when capturing the images of the scene on which images the present embodiments are applied. Because of the operator's interest in human activity, it is desired to identify and frequently send any information relating to such activity from the camera to a receiver, where the operator can view the images and monitor the human activity. That image information is referred to as image information for an object of interest. In contrast, the background in the scene serves mainly to put the actions of the foreground objects into an understandable context and can therefore be updated/sent less often. The background is either stationary or it may contain objects whose motion is, in a sense, uninteresting, and should not be rendered. One example of such motion would be tree branches swaying in the wind.

As a further means to keep the bandwidth down, image information about a movable object (i.e., an object that can change its geographical location) other than the object of interest, is ideally not sent at all, which not only saves bandwidth but also allows the operator to solely focus on the objects of interest. Such an object will be referred to herein as a "movable object of non-interest." An example of a movable object of non-interest is an animal. Another example is a vehicle of some kind. For example, if a security camera monitors an entrance of a building, it is typically more interesting to follow the behavior of a person on foot right outside the door, rather than a person on a bike or in a car quickly biking or driving past the building entrance. In yet another example, what is considered an object of non-interest can be determined based on other rules, such as location. For example, one can chose to treat persons outside a surveillance area as movable objects of non-interest and treat them as described above for the animals, whereas persons inside a surveillance area are treated as objects of interest.

During a background update time period, the movement of the movable object of non-interest is tracked and the background image is updated with parts of the background, that were blocked by the movable object of non-interest and were revealed when the movable object of non-interest moved. The background image may be updated incrementally as the object of non-interest moves during a background update time period. The background image is sent at a lower frame rate compared to the frame rate of the information with the object of interest. As noted above, the object of non-interest will not be shown to the operator. To this end, one embodiment includes refraining from including the movable object of non-interest in any of the background frame and the foreground frame.

In one embodiment, if the object of non-interest has not moved enough to reveal any background part during the background update time period, image information about the object of non-interest is sent in the stream of the object of interest so as not to get "holes" in the image. The receiver may put together an image of the image information with the object of interest (and possibly the object of non-interest) and the latest background image. Various embodiments will now be described by way of example and with reference to the drawings.

FIG. 1 shows a schematic diagram of an exemplary environment 100 in which various embodiments can be implemented. As can be seen in FIG. 1, a scene 102 with a person 104 walking towards a building 106 is captured by a camera system 108. It should be noted that the depiction of the scene 102 is merely a simplistic view for illustrative purposes. A scene 102 can be described, in a more general sense as any three-dimensional physical space whose size and shape is defined by the field of view of a camera recording the scene.

Figure 2:
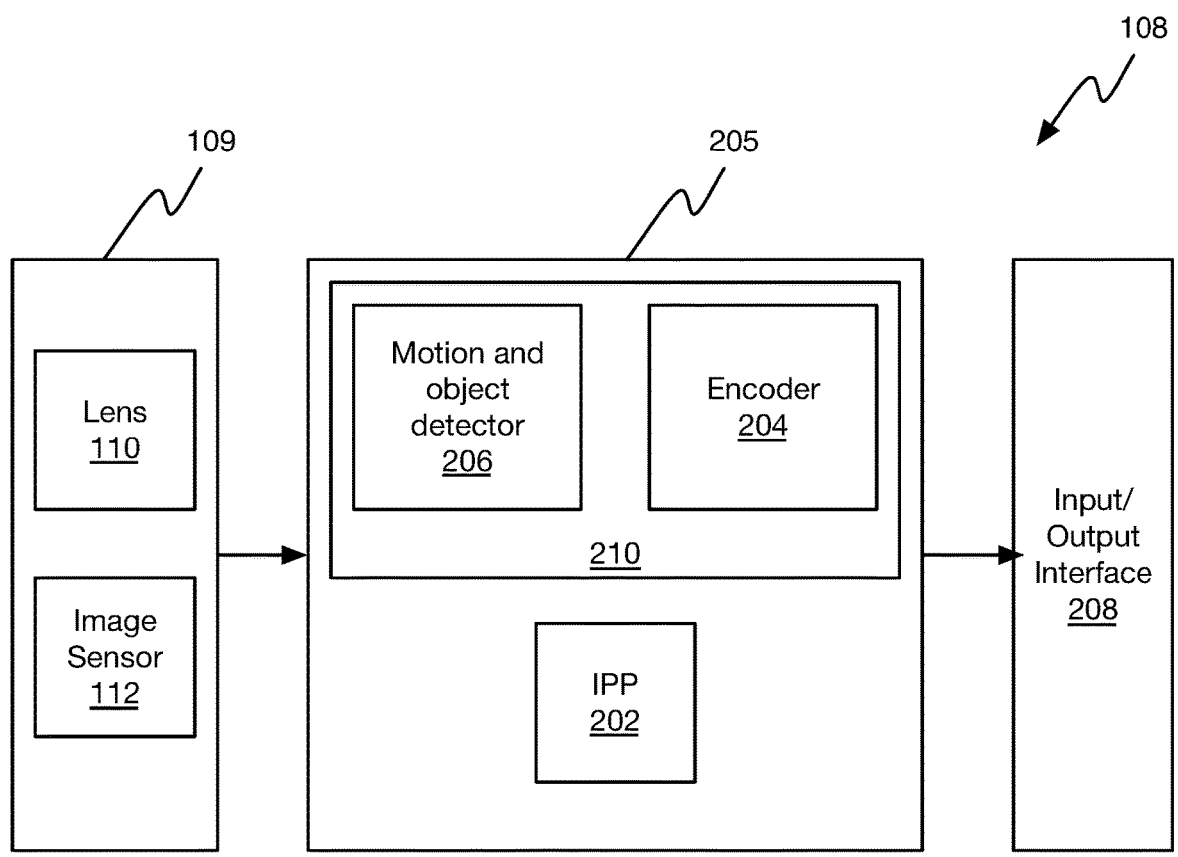
FIG. 2 is a block diagram showing a detailed view of the camera system 108 illustrated in FIG. 1, in accordance with one embodiment.

The camera system 108, e.g., a fixed camera system or a PTZ camera system in a stationary mode, i.e., a PTZ camera system having one and the same fixed PTZ setting, when capturing the image frames on which the embodiments are to be applied is illustrated in more detail in FIG. 2. The camera system 108 has a lens 110 that captures the scene 102 and projects it onto an image sensor 112. Together, the lens 110 and image sensor 112 form an image capturing system 109. The image sensor 112 captures a series of image frames, which together form a video stream. The image capturing system 109 is coupled to an image processing and encoding system 205, which includes an image processing pipeline 202 and an encoder 204, both of which will be described in further detail below. The image processing and encoding system 205 is preferably located inside the camera system 108, but could also be external to the camera system 108. For example, in a modular camera system, the image capturing system 109 and the image processing and encoding system 205 may be arranged separately from each other and arranged in communication with each other. Further, the image capturing system 109 may be movable while the image processing and encoding system 205 may be stationary.

In some embodiments, such as the one shown in FIG. 2, the image processing and encoding system 205 further include a motion and object detector 206. The encoder 204 and the motion and object detector 206 are comprised in an encoding system 210, which sometimes in this disclosure is referred to as an enhanced encoding system 210 since it is enhanced as compared to conventional encoding systems. The image processing pipeline 202 receives the signal from the image sensor 112 and performs various types of image processing operations, before the enhanced encoding system 210 encodes the video stream into a format that is suitable for transmission over a network to an operator via an input/output interface 208, as will be described in further detail below. In FIG. 1, the encoded video is transmitted wirelessly over a radio link 116 to a wired network 118, and eventually to a client 120, which is connected to the network 118, but of course there are many combinations of wireless and wired transmission models that can be used.

The client 120 has a display where an operator can view the image video stream from the camera. Typically, the client 120 is also connected to a server, where the video can be stored and/or processed further. Often, the client 120 is also used to control the camera 108, for example, by the operator issuing control commands at the client 120. For example, an operator may instruct the camera to zoom in on a particular detail of the scene 102, or to track the person 104 if she starts to move away from the tree 106. However, there are also situations in which an operator does not control the camera, but the camera is stationary and merely provides the image stream for the operator to view on the client 120.

As shown in FIG. 2, the camera system 108 includes a lens 110 imaging the scene 102 on an image sensor 112, an image processing pipeline (IPP) 202, an encoder 204, a motion and object detector 206, and an input and output interface 208 for communication with other devices. The IPP performs a range of various operations on the image data received from the image sensor 112. Such operations may include filtering, demosaicing, color correction, noise filtering (for eliminating spatial and/or temporal noise), distortion correction (for eliminating effects of e.g., barrel distortion), global and/or local tone mapping (e.g., enabling imaging of scenes containing a wide range of intensities), transformation (e.g., rotation), flat-field correction (e.g., for removal of the effects of vignetting), application of overlays (e.g., privacy masks, explanatory text, etc.). The IPP 202 may be associated with the motion and object detector 206, which is used to perform object detection and classification, as well as a range of other functions that will be described in further detail below. It should be noted that in some embodiments, some of these operations (e.g., transformation operations, such as correction of barrel distortion, rotation, etc.) may be performed by one or more subsystems outside the IPP 202, for example in a unit between the IPP 202 and the encoder 204.

Following the image IPP 202, the image is forwarded to an encoder 204, in which the information is encoded according to an encoding protocol and forwarded to the receiving client 120 over the network 118, using the input/output interface 208. The motion and object detector 206 is used to perform object detection and classification, as well as a range of other functions that will be described in further detail below, to provide the encoder 204 with the requisite information needed for performing the encoding operations. It should be noted that the camera system 108 illustrated in FIG. 2 also includes numerous other components, such as processors, memories, etc., which are common in conventional camera systems and whose purpose and operations are well known to those having ordinary skill in the art. Such components have been omitted from the illustration and description of FIG. 2 for clarity reasons. There are a number of conventional video encoding formats. Some common video encoding formats that work with the various embodiments include: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

Figure 3:
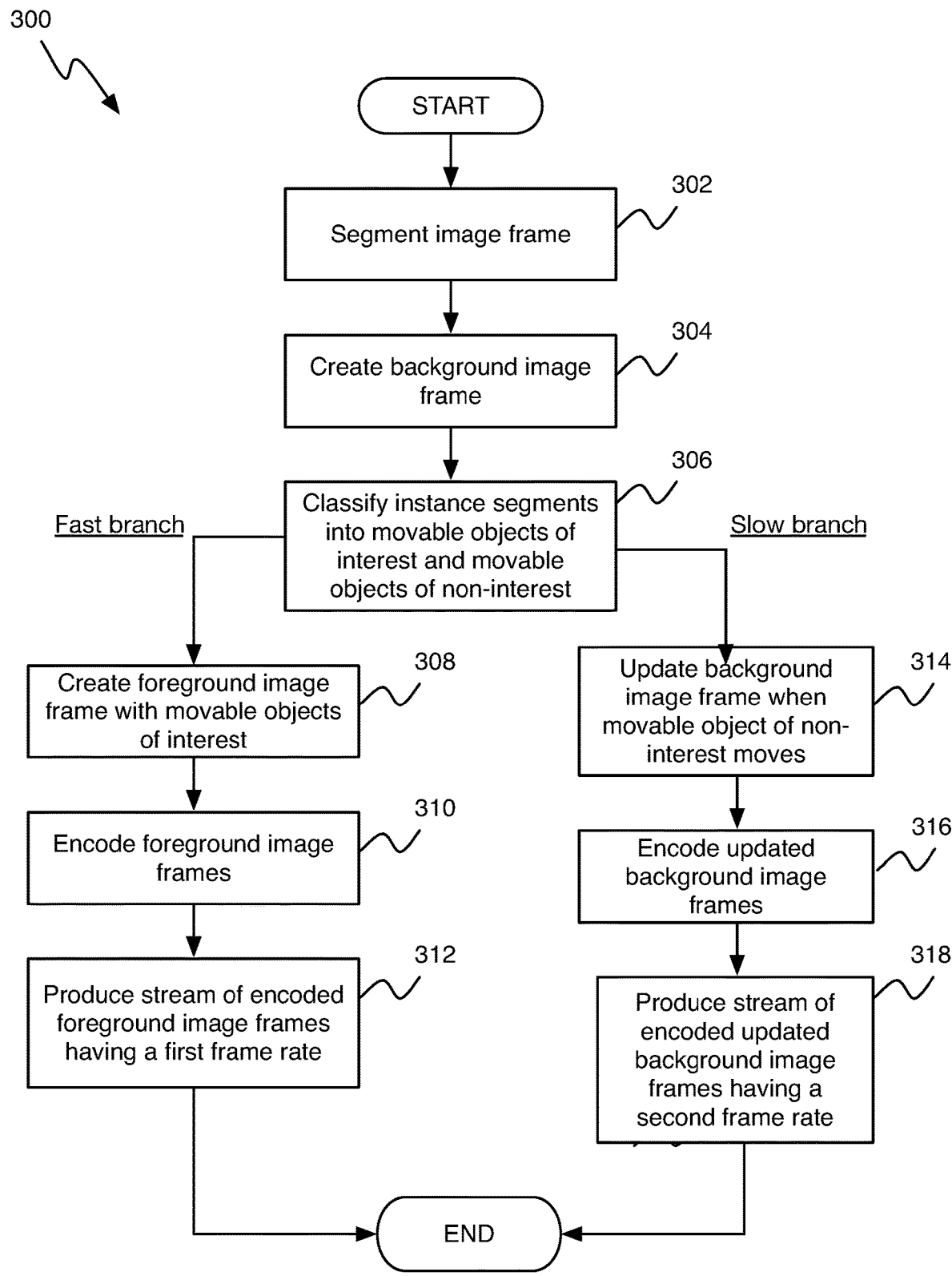
FIG. 3 is a flowchart showing a method for processing a stream of image frames, in accordance with one embodiment.

FIG. 3 shows a method for processing a stream of image frames captured by a camera, in accordance with one embodiment. As can be seen in FIG. 3, the method starts by segmenting an image frame into background segments and instance segments, step 302. This step may be performed by the motion and object detector 206. For example, the motion and object detector 206 may perform the segmentation in response to a request from the encoder 204. As mentioned above, the encoder 204 and the motion and object detector 206 are comprised in the enhanced encoding system 210. As was discussed above, in one embodiment, the segmentation is done using panoptic segmentation. The panoptic segmentation creates instances of the objects of interest (e.g., people) and instances of the objects of non-interest (e.g., animals), that is, each individual object is identifiable. The panoptic segmentation further creates one or more background segments, that is, regions which do not contain any instance segmentation (e.g., trees, and where individual trees are not distinguished from one another). Having this segmentation makes it possible to treat the different objects of interest differently from each other, and also to treat the background different from the objects of interest. It should be noted that the encoding may vary depending on the particular embodiment and scene at hand. For example, a forest might be better encoded as background segments, whereas a potted plant in an indoor setting might be encoded as a stationary but movable object of non-interest (as the potted plan may also be moved by somebody). Thus, many variations can be envisioned by those having ordinary skill in the art, depending on the particular circumstances at hand.

Next, a background image frame is created, step 304. This step may be performed by the encoder 204. The background image frame contains the background segments that were identified in step 302. In some embodiments, the background image frame also contains stationary objects of non-interest, as will be described in further detail below. In other embodiments the background only contains the background segments. It should be understood that the creation of a background image frame is not done for every frame. Further it should be understood that the created background image frame may be updated with information from subsequent image frames during a background update period of time as will be described below with reference to step 314.

Next, the instance segments are classified into moving objects of interest and moving objects of non-interest, respectively, step 306. This step may be performed by the motion and object detector 206. What is considered to be a moving object of interest and a moving object of non-interest, can be determined based on the particular use case at hand. For example, in some embodiments, an operator may choose on a given day that cows are a moving object of interest, whereas people are a moving object of non-interest. On a different day, the situation might be the reverse, and the operator may also include cars as moving objects of interest, etc. Typically, the operator can select which objects are considered moving objects of interest and moving objects of non-interest, respectively, from a list of categories of objects which the system has been trained in advance to recognize. By making this selection, only information on the moving objects of interest will be sent to the operator, and she will not be distracted by "irrelevant" information in the video stream.

In some embodiments there is yet another classification: stationary objects of non-interest. These objects are instance segments, which contain some movement, despite being stationary. One example of a stationary object of non-interest is a tree. The tree is an instance of an object that can be identified using panoptic segmentation. The tree is stationary in the sense that it does not change locations. The tree branches may move in the wind, but this movement is generally of little or no interest with respect to most monitoring situations. Thus, the tree is a stationary object of non-interest, and in order to save bandwidth, the tree can be added to the background image frame, which is updated only infrequently. In most embodiments, the operator is provided with an option to define what movement is "acceptable" for including a stationary object of non-interest in a background image frame, or there may be predefined criteria for automatically making such a decision by the camera system.

Typically, the movable objects of non-interest are neither encoded nor sent to the operator, as they are of little or no interest as was described above. However, stationary but movable objects of non-interest (e.g., a potted plant) can sometimes be included in the background, as opposed to animals that are movable but not expected to be stationary. In many situations, the decision on whether to include a stationary, but movable object of non-interest in the background section depends on what the operator finds acceptable. As will be described in further detail below, the background image frames may be sent to the receiver and the operator at a rate of approximately one image frame per minute. After the classifying in step 306, the process splits into a fast branch, which pertains to the processing of the moving objects of interest, i.e., the foreground image frames, and a slow branch, which pertains to the processing of the background images. Each of these branches will now be described.

In step 308, a foreground image frame is created which contains the movable objects of interest. This step may be performed by the encoder 204. As was described above, including only the movable objects of interest in the foreground image frame and excluding movable objects of non-interest from both the foreground image frame and background image frame makes it possible to provide the most relevant information to the operator monitoring the scene. Using the scene 102 of FIG. 1 as an example, if the operator was only interested in human activity, only person 104 would be included in the foreground image frame. As was noted above, persons are merely one example of movable objects of interest. Other common examples include vehicles, weapons, bags, or face masks, depending on the particular scene or surveillance situation at hand.

After creating the foreground image frames, blocks of pixels in each frame are encoded by the encoder 204, step 310. For the foreground image frames, the encoder 204 encodes the blocks of pixels belonging to the moving object(s) of interest 104 using conventional techniques, and encodes the remainder of the foreground image frame as black pixels. Encoding pixels as black pixels (or any other color) allows blocks of pixels to be encoded as having a location coordinate, a width and a height, as discussed above, which saves a significant amount of data compared to conventional encoding. In step 312, a stream of encoded foreground image frames having a first frame rate is produced. This may be performed by the encoder 204. The stream of encoded foreground image frames may be sent with the first frame rate to a receiver or it may be sent to a storage.

Turning now to the slow branch of process 300, in step 314, a timer is set, which defines a background update time period. During this background update time period, the background image frame is updated when a background area is revealed as a result of a movable object of non-interest changing its position. This step may be performed by the encoder 204 updating the background image frame and the motion and object detector 206 determining the motion of the movable object of non-interest. These updates are done in order to avoid the appearance of "holes" in the background at the expiration of the background update time period. The background update time period is typically related to the frame rate for the background image frame, which is generally in the order of about one minute. Depending on the number of movable objects of non-interest and the amount of movement, the background image frame may be updated several times during the background update time period to fill in any "empty regions" created as a result of the movement of the movable objects of non-interest.

The movements of any movable objects of non-interest are tracked using a motion and object detector 206, as described above. In some embodiments, the motion and object detector 206 serves as a trigger for determining when an update of the background image frame is needed. For example, a threshold value can be set such that if a movable object of non-interest moves more than a certain number of pixels in the background image frame, an update of the background image frame is triggered. The threshold value can be set, for example, based on the available computational resources. For example, a camera system which has limited computational resources may update the background image frame less often than a camera which has plentiful computational resources.

In some embodiments, at the end of the background update time period, a completeness of the updates to the background image frame are verified to ensure that a complete background image frame. This may be performed by the encoder 204. "Completeness" in this context simply refers to ensuring that there are no "holes" in the background image which result from the movement of a movable object of non-interest and which have not been filled with background pixel information at the end of the background update period. If it is determined that the updates to the background image frame were incomplete, the motion and object detector 206 can be used to determine which movable object of non-interest causes the incompleteness, and that object can instead be processed as part of the foreground image frame together with the movable objects of interest, as described above.

Next, similar to the fast branch, in the slow branch the updated background images are encoded by the encoder, step 316. It should be noted that even if the background image frame may be updated several times during the background update period of time, the encoding of the background image frames is only performed once per update period of time, for example at the end of each background update period of time. The encoding of the background images may use conventional encoding techniques.

Figure 4:
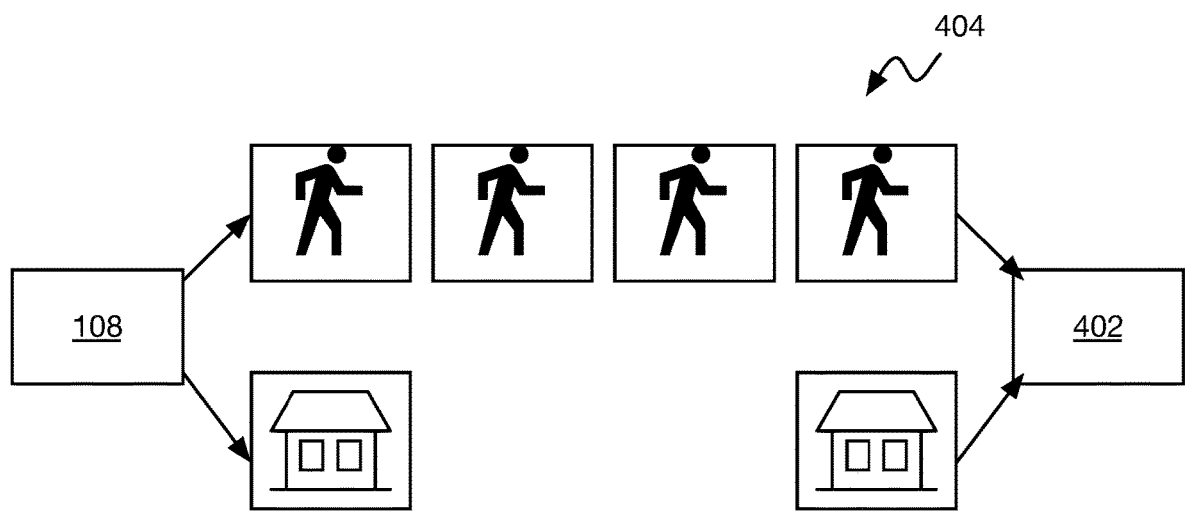
FIG. 4 is a schematic illustration of a foreground image video stream and a background image video stream that are sent from a camera system to a receiver, in accordance with one embodiment.

Finally, in step 318, a stream of encoded updated background image frames having a second frame rate is produced. As mentioned above, the second frame rate is lower than the first frame rate. The stream of encoded background image frames may be sent to the receiver at a slower frame rate compared to the frame rate of the foreground image frames. FIG. 4 schematically shows how a stream of encoded foreground image frames 404 is sent at a first frame rate, and a stream of encoded background image frames 406 is sent at a second, slower, frame rate from the camera system 108 to a receiver 402. It should be noted that for ease illustration purposes in FIG. 4, the background image frames are illustrated as being sent for every three foreground image frames. However, in a typical scenario, the frame rate for the stream of foreground image frames is typically 30 frames per second, and the frame rate for the stream of background image frames is typically about one frame per minute, so in a real world scenario, the difference between the two streams is considerably larger than what is illustrated in FIG. 4. When the two image streams leave the camera system, they are in a format that can be decoded and otherwise processed by the receiver 402, e.g., a conventional decoder. The receiver 402 may be comprised in or may be connected to the client 120 illustrated in FIG. 1.

At the receiver 402, the two image streams are fused together to create a composite image stream for the operator to view. This can be done using a wide range of standard techniques that are familiar to those having ordinary skill in the art. For example, there may be a gradual fusing along the edges of objects to make the viewing experience more pleasant for the operator. There are many ways to achieve this gradual fusing, which are familiar to those having ordinary skill in the art. For example, object and background pixels can be added and averaged, weights can be applied such that higher weight is given to the background, and blending curves could be used that specify the weights (also referred to as alpha blending).

While the above examples have been described in the context of visible light, the same general principles of encoding and sending background and foreground frames at different frame rates can also be applied in the context of thermal cameras, if appropriate modifications are made, primarily due to the nature of the image sensors being used in cameras that operate in the visible light range vs. infrared light range.

The systems, parts thereof such as the image processing pipeline, the encoder and the motion and object detector, and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages as shown in the embodiments above. Thus, the teachings should not be limited to the shown embodiments but should only be defined by the appended claims. Additionally, as the skilled person understands, the shown embodiments may be combined.

The invention claimed is:

1. A method, in an encoding system, for producing streams of image frames, comprising:
   segmenting image frames in a stream of image frames into one or more background areas and one or more objects;
   creating a background image frame that contains the one or more background areas;
   classifying at least some of the one or more objects into movable objects of interest and into movable objects of non-interest;
   updating, during a background update time period, the background image frame when a movable object of non-interest has moved to reveal a further background area, to include the further background area in the background image frame;
   at the end of the background update time period, verifying a completeness of the updates to the background image frame;
   in response to determining that the background image frame updates are incomplete:
      determining which movable object of non-interest caused the incompleteness; and
      including the movable object of non-interest that caused the incompleteness in the foreground image frame;
   in response to determining that the entire background image frame has been updated:
      refraining from including the movable object of non-interest in any of the background frame and the foreground frame;
   creating a foreground image frame that contains the movable objects of interest;
   encoding blocks of pixels of the updated background image frame;
   encoding blocks of pixels of the foreground image frame;
   producing a stream of encoded foreground image frames having a first frame rate; and
   producing a stream of encoded updated background image frames having a second frame rate that is lower than the first frame rate.

2. The method of claim 1, wherein the segmenting of image frames is done using panoptic segmentation, wherein pixels in the image frame are either assigned to a background area including a group of objects of a particular type, or assigned to an individual object.

3. The method of claim 1, further comprising receiving a user selection from a list of object types, the user selection indicating which types of objects should be considered movable objects of interest and movable objects of non-interest.

4. The method of claim 1, wherein the movable objects of interest include one or more of: humans, vehicles, weapons, bags, and face masks.

5. The method of claim 1, wherein the movement of the movable object of non-interest is tracked by a motion and object detector during the background update time period, and wherein the background image frame is updated several times before the expiration of the background update time period.

6. The method of claim 1, wherein encoding the foreground image frame includes encoding pixel data only for pixels corresponding to movable objects of interest, and encoding the remainder of the foreground image frame as black pixels.

7. The method of claim 1, wherein the first frame rate is thirty image frames per second and the second frame rate is one image frame per minute.

8. The method of claim 1, further comprising:
classifying an object as a stationary object of non-interest; and
updating the background image frame to include the stationary object of non-interest.

9. The method of claim 1, wherein updating the background image frame when a movable object of non-interest has moved to reveal a background area includes:
comparing the movement of the movable object of non-interest with one or more of: an area-dependent threshold value, distance-dependent threshold value and a time-dependent threshold value; and
when the movement of the movable object of non-interest exceeds at least one threshold value, updating the background image frame.

10. The method of claim 9, further comprising:
setting the threshold values based on available computing resources.

11. The method of claim 10, wherein setting the threshold values includes:
setting the threshold values such that a frequency of the updating of the background image frame is limited to a frequency of updating that can be accommodated by available computing resources.

12. An encoding system for producing streams of image frames, comprising an encoder and a motion and object detector, wherein
the motion and object detector is configured to:
segment image frames in a stream of image frames into one or more background areas and one or more objects; and
classify at least some of the one or more objects into movable objects of interest and into movable objects of non-interest; and wherein
the encoder is configured to:
create a background image frame that contains the one or more background areas;
update, during a background update time period, the background image frame when a movable object of non-interest has moved to reveal a further background area, to include the further background area in the background image frame;
at the end of the background update time period, verifying a completeness of the updates to the background image frame;
in response to determining that the background image frame updates are incomplete:
determining which movable object of non-interest caused the incompleteness; and
including the movable object of non-interest that caused the incompleteness in the foreground image frame;
in response to determining that the entire background image frame has been updated:
refraining from including the movable objects of non-interest in any of the background frame and the foreground frame;
create a foreground image frame that contains the movable objects of interest;
encode blocks of pixels of the updated background image frame;
encode blocks of pixels of the foreground image frame;
produce a stream of encoded foreground image frames having a first frame rate; and
produce a stream of encoded updated background image frames having a second frame rate that is lower than the first frame rate.

13. A computer program product for producing streams of image frames, the computer program product comprising a computer readable storage medium having program instructions embodied therewith, wherein the computer readable storage medium is not a transitory signal per se, the program instructions being executable by a processor to perform a method comprising:
segmenting image frames in a stream of image frames into one or more background areas and one or more objects;
creating a background image frame that contains the one or more background areas;
classifying at least some of the one or more objects into movable objects of interest and into movable objects of non-interest;
updating, during a background update time period, the background image frame when a movable object of non-interest has moved to reveal a further background area, to include the further background area in the background image frame;
at the end of the background update time period, verifying a completeness of the updates to the background image frame;
in response to determining that the background image frame updates are incomplete:
determining which movable object of non-interest caused the incompleteness; and
including the movable object of non-interest that caused the incompleteness in the foreground image frame;
in response to determining that the entire background image frame has been updated:
refraining from including the movable objects of non-interest in any of the background frame and the foreground frame;
creating a foreground image frame that contains the movable objects of interest;
encoding blocks of pixels of the updated background image frame;
encoding blocks of pixels of the foreground image frame;
producing a stream of encoded foreground image frames having a first frame rate; and
producing a stream of encoded updated background image frames having a second frame rate that is lower than the first frame rate.

* * * * *